United States Patent
Okabayashi et al.

(10) Patent No.: US 8,677,069 B2
(45) Date of Patent: Mar. 18, 2014

(54) SEMICONDUCTOR STORAGE DEVICE

(75) Inventors: Hiroko Okabayashi, Tokyo (JP);
Tetsuya Kaise, Tokyo (JP); Noriaki Emura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 668 days.

(21) Appl. No.: 12/413,701

(22) Filed: Mar. 30, 2009

(65) Prior Publication Data

US 2009/0248981 A1    Oct. 1, 2009

(30) Foreign Application Priority Data

Mar. 31, 2008    (JP) ................... 2008-092617

(51) Int. Cl.
*G06F 12/02*    (2006.01)
*G06F 13/20*    (2006.01)

(52) U.S. Cl.
USPC ............ 711/115; 711/103; 711/E12.008; 710/313

(58) Field of Classification Search
USPC ............ 711/115, 103, E12.008; 710/313
See application file for complete search history.

(56) References Cited

U.S. PATENT DOCUMENTS

| | | | | |
|---|---|---|---|---|
| 4,949,242 A | * | 8/1990 | Takeuchi et al. | 711/219 |
| 2005/0160223 A1 | * | 7/2005 | Chen et al. | 711/115 |

FOREIGN PATENT DOCUMENTS

| | | |
|---|---|---|
| JP | 2003-50725 | 2/2003 |
| JP | 2004-133695 | 4/2004 |
| JP | 3118657 | 1/2006 |
| JP | 2006-31123 | 2/2006 |
| KR | 10-0761066 | 9/2007 |

\* cited by examiner

*Primary Examiner* — Yong Choe
(74) *Attorney, Agent, or Firm* — Oblon, Spivak, McClelland, Maier & Neustadt, L.L.P.

(57) ABSTRACT

Provided is a semiconductor storage device having a first interface section meeting a USB standard for connection to host equipment, a NAND memory section that is a first semiconductor memory section, a second interface section to which small memory cards can be connected, each small memory card having a second semiconductor memory section, and a controller capable of controlling the NAND memory section and the second semiconductor memory sections by one linear address.

14 Claims, 5 Drawing Sheets

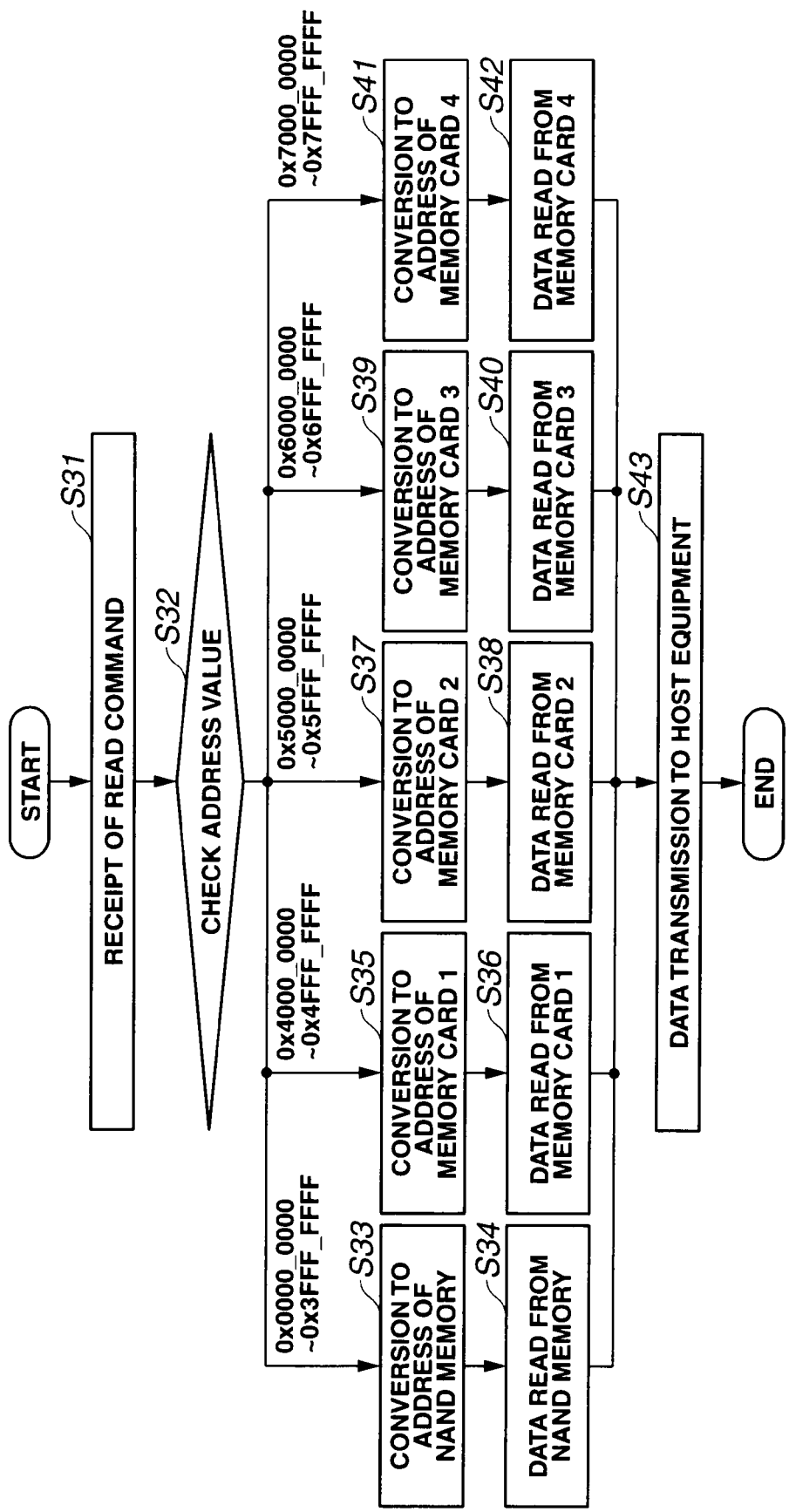

SEMICONDUCTOR STORAGE DEVICE

CROSS REFERENCE TO RELATED APPLICATION

This application claims the benefit of Japanese Application No. 2008-092617 filed in Japan on Mar. 31, 2008, the contents of which are incorporated herein by this reference.

BACKGROUND OF THE INVENTION

1. Field of the Invention

The present invention relates to a semiconductor storage device and, more particularly, to a semiconductor storage device whose storage capacity can be increased by being connected to a second semiconductor storage device.

2. Description of Related Art

In recent years, the development of semiconductor storage devices and, particularly, semiconductor storage devices that perform storage in a flash memory, which is a nonvolatile storage medium, has been carried out, and these semiconductor storage devices have come into widespread use as auxiliary storage devices of host equipment, such as personal computers, cell phones and digital cameras. With the capacity of data handled by host equipment having become large, large capacity designs and high density designs of flash memories also are going ahead. Among others, recent years have seen particularly frequently used NAND type flash memories.

A NAND type flash memory uses electric charges injected from a channel into a charge accumulation layer via an insulating film as information of digital bits, measures changes in the conductance of a field-effect transistor that depend on the charge amount, and reads out information. Unlike a DRAM, a NAND type flash memory is capable of readouts multiple times without data corruption.

Small semiconductor storage devices with excellent portability in which the NAND type flash memory is used can be broadly divided into a USB memory unit (hereinafter referred to as a "USB memory") that is frequently used in personal computers (hereinafter also referred to as a "PCs") and the like and a memory card that is frequently used in cell phones and digital cameras.

Most data retained in a USB memory and the like has hitherto been still images or music data with relatively small capacity and the like. For this reason, users were able to retain desired data without problems by using a semiconductor storage device having a capacity of 1 GB, for example. In recent years, however, users have come to be able to receive digital TV broadcasting by use of PCs and the like. When a 1-hour digital TV program is recorded with image quality equivalent to the image quality of DVD-Video, the data obtains a capacity on the order of 2 GB. Moreover, there is an increasing number of cases where users retain data in a small semiconductor storage device with excellent portability and carry the semiconductor storage device in order to watch digital TV programs in desired places. However, in the past in cases where users wanted to retain moving image data of high image quality and on other occasions, the retention was sometimes impossible because the capacity of the semiconductor storage device that permits retention was insufficient.

On the other hand, in NAND type flash memories, the storage capacity of one chip has been increasing at a double pace in one to several years due to the miniaturization of the wiring line width and the multiple-value storage method. For this reason, when new-type memory cards and the like whose storage capacity is twice to four times the storage capacity of old-type memory cards and the like have made their appearance, the old-type memory cards have been brought out of service before the expected product life thereof is reached.

Japanese Registered Utility Model No. 3100895 discloses a memory card reader/writer device in which a USB memory and various kinds of memory cards are connected to host equipment via one USB interface section.

In this memory card reader/writer device, however, though it is possible to connect a plurality of memory cards to one device, each of the connected plurality of memory cards is handled as a separate memory and hence it is impossible to retain one piece of data having such a large capacity as would exceed the capacity of individual memories. Furthermore, this memory card reader/writer device requires a large case and is very inconvenient in terms of portability. That is, this memory card reader/writer device is literally a mere connection interface device for use in a case where host equipment has no specific interface, such as a memory card, and reads data from the memory card and writes data on the memory card.

SUMMARY OF THE INVENTION

According to one aspect of the present invention, there is provided a semiconductor storage device that includes: a first interface section for connection to host equipment; a first semiconductor memory section; and a second interface section to which one or more second semiconductor storage devices can be connected, each having a second semiconductor memory section. The semiconductor storage device has a control section that can control the first semiconductor memory section and the one or more second semiconductor memory sections by one linear address.

BRIEF DESCRIPTION OF THE DRAWINGS

FIG. 5 is a flowchart to explain the flow of the processing performed when host equipment reads out data from a USB memory.

DESCRIPTION OF PREFERRED EMBODIMENTS

Figure 1:
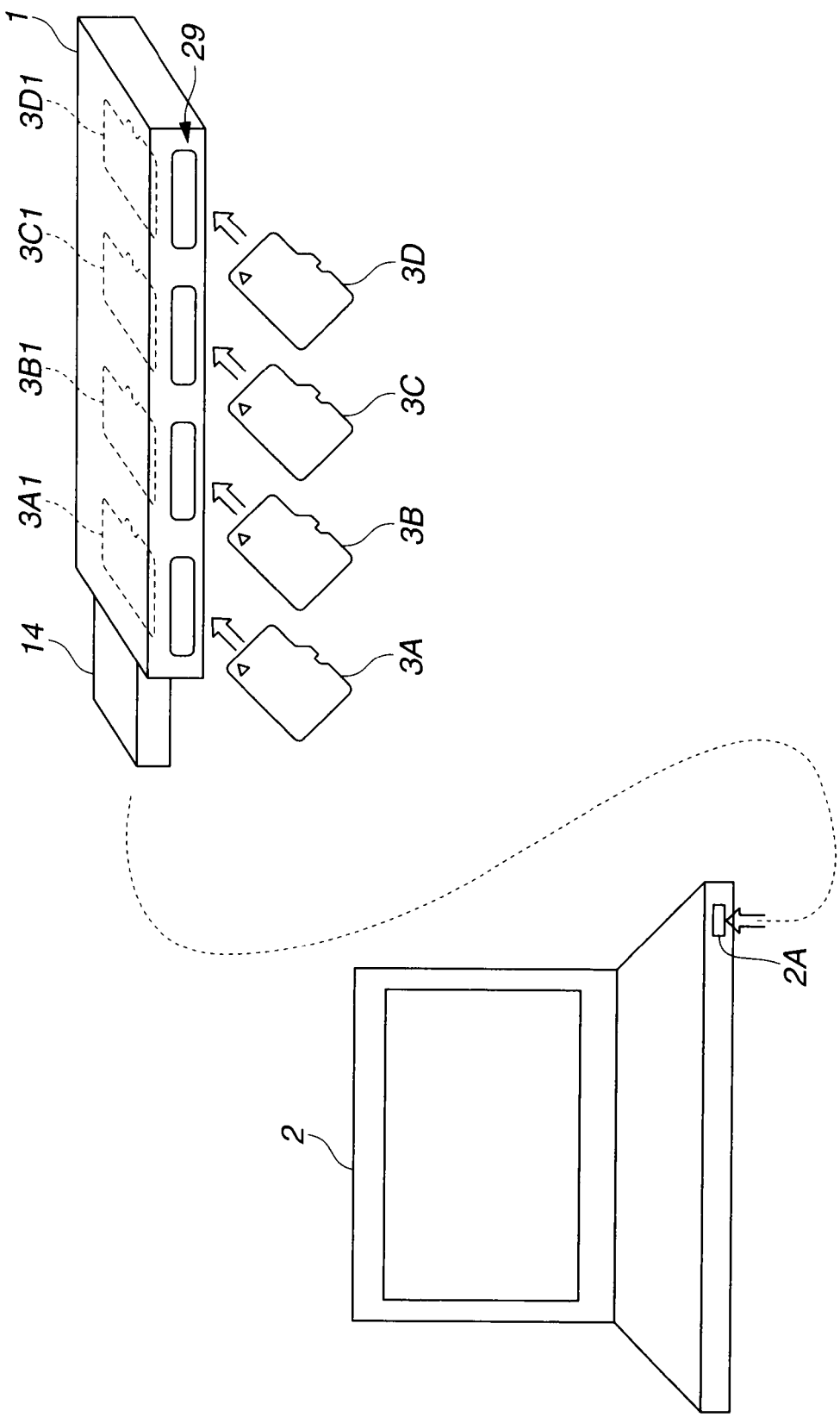
FIG. 1 is an explanatory diagram to explain the mode of use of a USB memory that is a semiconductor storage device of an embodiment.
Figure 2:
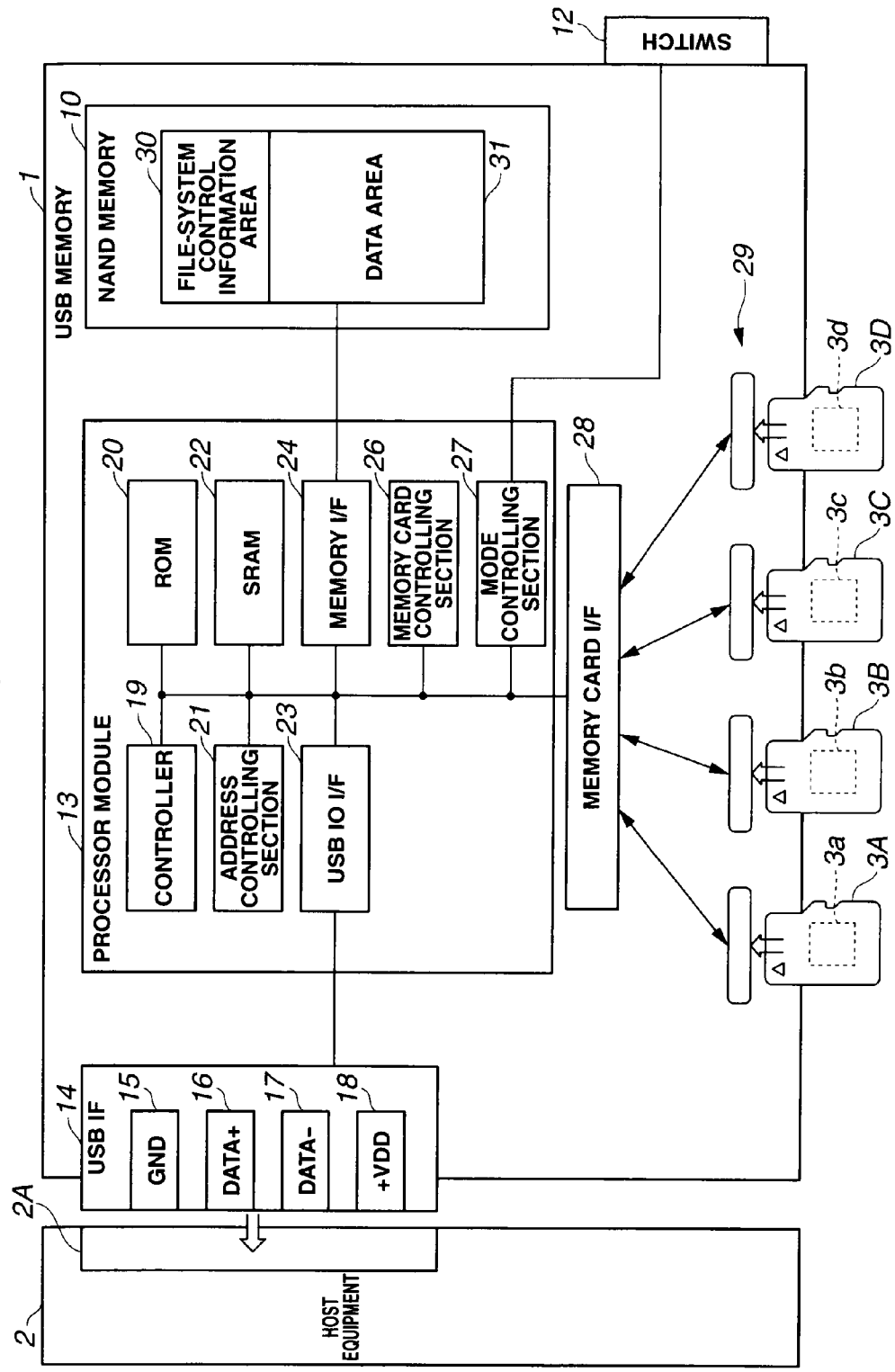
FIG. 2 is a block diagram showing the configuration of the USB memory that is the semiconductor storage device of the embodiment.

An embodiment of the present invention will be described below with reference to the accompanying drawings. FIG. 1 is an explanatory diagram to explain the mode of use of a USB memory 1 that is a semiconductor storage device of the present embodiment, and FIG. 2 is a block diagram showing the configuration of the USB memory 1 that is the semiconductor storage device of the present embodiment.

As shown in FIG. 1, the USB memory 1 that is a first semiconductor storage device is used by inserting a USB interface section 14 into a USB connector 2A of a PC, which is host equipment 2. Incidentally, to explain the USB memory 1, the USB memory 1 is depicted on a large scale compared to the host equipment 2 in FIG. 1. An actual size of the USB memory is on the order of, for example, 2 cm in width, 7 cm in length, 1 cm in thickness.

The USB memory refers to a semiconductor storage device which is such that the host equipment 2 can perform the reading and writing of data via an interface section meeting the USB (Universal Serial Bus) standard (hereinafter also referred to as a "USB bus"). The USB standard covers a specification called the USB Mass Storage Class for connection of an auxiliary storage device to the host equipment 2, and any equipment and operating system corresponding to this class can recognize equipment connected via a USB bus as a storage device by standard functions alone without the necessity for installation of a driver in the host equipment 2. A semiconductor storage device in which this mechanism is used is the USB memory 1.

The USB memory 1 that is the first semiconductor storage device can house four micro SD cards, which are second semiconductor devices, in the housing thereof. That is, the USB memory 1 has internal spaces 3A1 to 3D1 in which small memory cards 3A to 3D can be housed. The size of the micro SD card is 11 mm in width, 15 mm in length, 1.0 mm in thickness. Incidentally, when each of the small memory cards 3A to 3D is to be designated hereinafter, the pertinent small memory card is called a small memory card 3.

That a small memory card 3 can be housed in the housing of the USB memory 1 means that the outer size of the USB memory 1 into which the small memory card 3 is inserted is equal to the outer size of the USB memory 1 into which no small memory card 3 is inserted. In other words, the USB memory 1 has slots 29, which are insertion holes for one or more small memory cards 3, and is configured in such a manner that one or more small memory cards 3 are physically housed in the USB memory 1.

Because the SD standard is a standard related to semiconductor storage devices in which a NAND type flash memory specified by the SD Association (SDA) is used, and is a standard that can be said to be a de facto standard for memory cards, the SD standard is widely used. For this reason, it is particularly preferred that a memory card to be combined with the USB memory 1 be a memory card meeting the SD standard, i.e., a memory card configured to perform reading and writing via an interface section meeting the SD standard.

Incidentally, with technological advances having been made, various classes have been specified for the SD standard, but a memory card of any class may be used in combination with the USB memory 1. However, because of small size and large capacity, a memory card meeting the micro SD standard or a micro SDHC standard is particularly preferable.

Next, by use of FIG. 2 a description will be given of the configuration of the USB memory 1 that is the semiconductor storage device of the present embodiment. The USB memory 1 has the USB interface section 14 that is a first interface section, a controller 19 that is a control section, a NAND memory section 10 that is a first semiconductor memory section, a switch 12 that is a mode selecting section that permits switching from the outside, and an interface section 28 for small memory card that is a second interface section. Small memory cards 3 that are four second semiconductor storage devices have second semiconductor memory sections $3a$ to $3d$ respectively. Also the second semiconductor memory sections $3a$ to $3d$ are NAND type flash memories.

The USB interface section 14 is the interface section 14 meeting the USB standard and has a VDD terminal 18 as a power supply terminal, a grounding terminal 15, a data plus terminal 16 and a data minus terminal 17.

A processor module 13 has a controller 19 that is a control section of the whole USB memory 1, an SRAM 22 used as a work buffer memory, a ROM 20 in which a control program is stored, a USB IO interface section 23 that communicates with the USB interface section 14, a memory interface section 24 that forms an interface section with the NAND memory section 10, a mode controlling section 27 that checks and controls a memory control mode, which will be described later, according to the condition of the switch 12, an address controlling section 21 that controls a logical memory map and calculates an address for access to the small memory card 3 on the basis of results of the mode controlling section 27, and a memory card controlling section 26 that stores control information on the small memory card 3.

The mode controlling section 27 is also a section configured to switch the memory control mode according to the condition of the switch 12, which is the mode selecting section. The USB memory 1 of the present embodiment enables two kinds of memory control modes, which are mode 1 and mode 2, to be used in a switching manner.

When the memory control mode is mode 1, the controller 19 controls the NAND memory section 10 that is the first semiconductor memory section inside the USB memory 1 and the second semiconductor memory sections $3a$ to $3d$ of the small memory card 3 inserted into the slot 29 as memories that are separate from each other by independent linear addresses, and makes access as memories that are separate from each other. That is, the USB memory 1 works like a reader/writer of the small memory card 3.

Incidentally, the small memory card 3 inserted into the slot 29 is a small memory card 3 that is in a condition capable of being controlled by the controller 19 of the USB memory 1 via the interface section for small memory card 28.

In contrast to this, when the memory control mode is mode 2, the controller 19 handles each of the second semiconductor memory sections $3a$ to $3d$ of the small memory card 3 inserted into the slot 29 as a so-called expansion memory of the NAND memory sections 10, which is the first semiconductor memory section inside the USB memory 1, and controls the whole as one memory by a continuous one linear address. In other words, the plurality of memory sections controlled by one linear address are recognized by the host equipment 2 as one memory section having a storage capacity that is a total of the storage capacities of the plurality of memory sections.

When the memory control mode is mode 2, an address controlling section 21 controls a logical memory map to be used. When the memory control mode is mode 2, the address controlling section 21 determines on the basis of a logical memory map whether an address value sent from the host equipment 2 is an address of the first semiconductor memory section or an address value of the second semiconductor memory section, and converts the sent address value into an address value of each memory.

When the memory control mode is mode 2, the memory card controlling section 26 controls the media ID (hereinafter referred to as a "MID") information of the small memory card 3. Although the address controlling section 21 controls a logical memory map, it is necessary to update the logical memory map when a small memory card inserted into the slot 29 has been replaced with another small memory card and on other occasions. For this reason, the memory card controlling section 26 controls the small memory card 3 used in mode 2 of the memory control mode. Also, the memory card controlling section 26 obtains a MID from a small memory card 3 connected to the USB memory 1 immediately after the USB memory 1 is turned on, checks whether the MID is in agreement with the information retained in the memory card controlling section 26, and retains the result.

The NAND memory section 10 that is the first semiconductor memory section is divided into a data area 31 in which data of users is retained, and a file-system control information area 30 in which information for controlling the data is stored in the data area 31 and the like.

The switch 12 is the mode selecting section by use of which the user selects a memory control mode, and the controller 19 can perform mode switching according to the setting of the switch 12. The mode controlling section 27 checks the memory control mode on the basis of the information on the switch 12.

Figure 3:
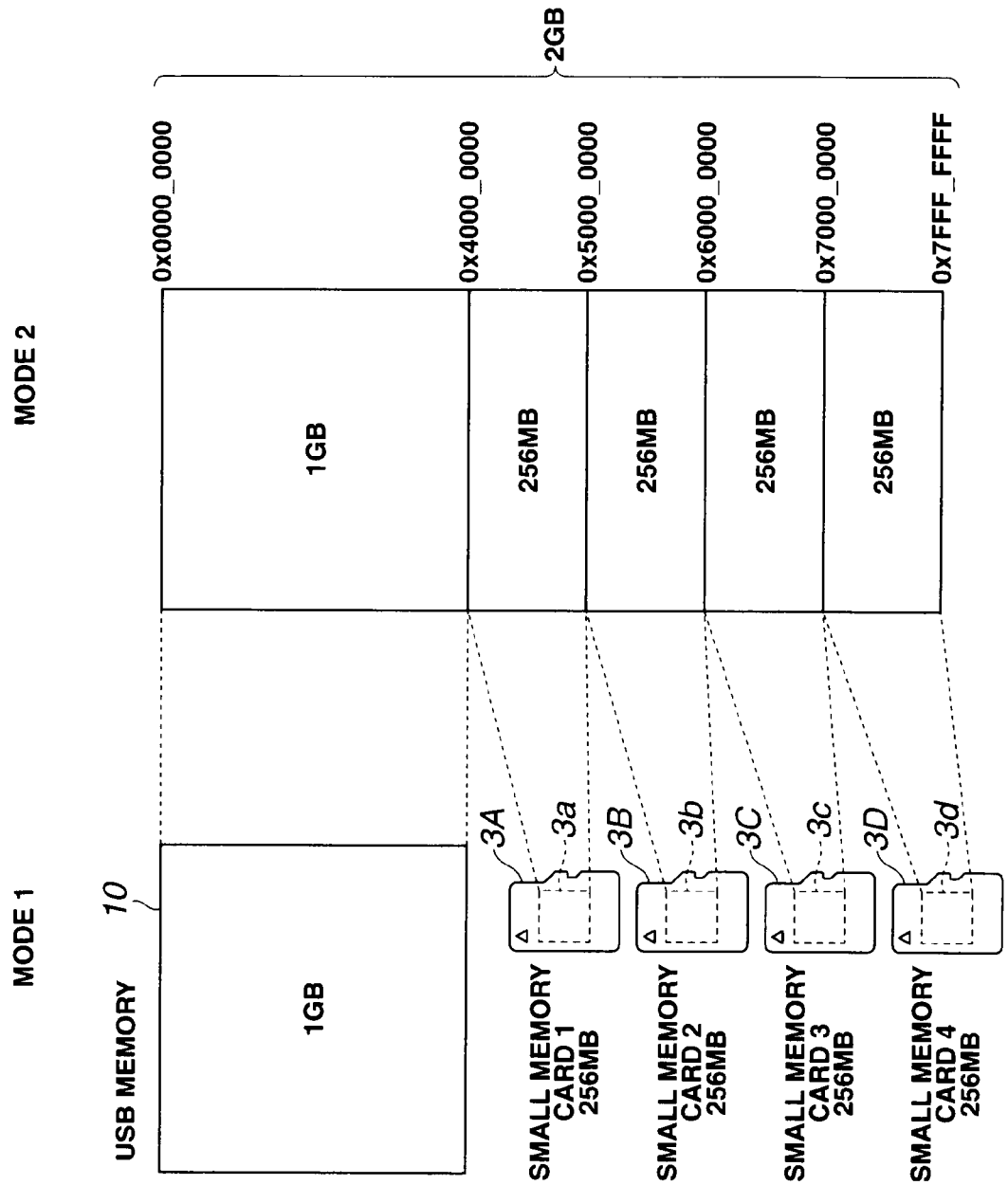
FIG. 3 is a logical memory map of a USB memory.

Next, by use of FIG. 3 a description will be given of a memory map of the USB memory 1 that is the semiconductor storage device of the present embodiment. FIG. 3 shows an example of a logical memory map of the USB memory 1. FIG. 3 shows a memory map in a case where the capacity of the NAND memory section 10 that is the first semiconductor memory section of the USB memory 1 is 1 GB and four small memory cards 3A to 3D, for which the capacity of the second semiconductor memory sections 3a to 3d is each 256 MB, are connected to the USB memory 1.

When the memory control mode is mode 1, the NAND memory section 10 that is the first semiconductor memory section thereof and the four second semiconductor memory sections 3a to 3d are controlled as memory sections that are separate from each other. That is, the controller 19 that is the control section controls the first semiconductor memory section and the second semiconductor memory sections by linear addresses that are independent of each other. For this reason, even when the user intends to retain data having a capacity of 1.2 GB, for example, in the USB memory 1, the capacity of the NAND memory section 10 having a maximum capacity is 1 GB and, therefore, the capacity is insufficient. Accordingly, the data cannot be retained.

In contrast to this, when the memory control mode is mode 2, as shown in FIG. 3, the USB memory 1 controls the second semiconductor memory sections 3a to 3d of the inserted small memory card 3 as an expansion memory of the NAND memory section 10 that is the first semiconductor memory section. That is, the controller 19 that is the control section controls the NAND memory section 10 that is the first semiconductor memory section and the second semiconductor memory sections 3a to 3d by a continuous address, i.e., one linear address. For this reason, the USB memory 1 works as if the USB memory 1 were a USB memory having a memory section with a capacity of 2 GB. Therefore, the user can retain data having a capacity of 1.2 GB in the USB memory 1.

In this connection, for example, a case where the host equipment 2 has made access to an address value of the USB memory 1 "0x5000_0000" is considered. When the memory control mode is mode 1, the capacity of the NAND memory section 10 is 1 GB and, therefore, the address value ranges from "0x0000_0000" to "0x3FFF_FFFF." Therefore, an error occurs when the host equipment 2 makes access to the address value of "0x5000_0000."

In contrast to this, when the memory control mode is mode 2, the address controlling section 21 controls the second semiconductor memory sections 3a to 3d as an expansion memory of the NAND memory section 10 that is the first semiconductor memory section and, therefore, the total capacity of the USB memory 1 becomes 2 GB and the address value is expanded to a range of "0x0000_0000" to "0x7FFF_FFFF." Therefore, the host equipment 2 comes to be able to make access to the address value of the USB memory 1 "0x5000_0000."

Figure 4:
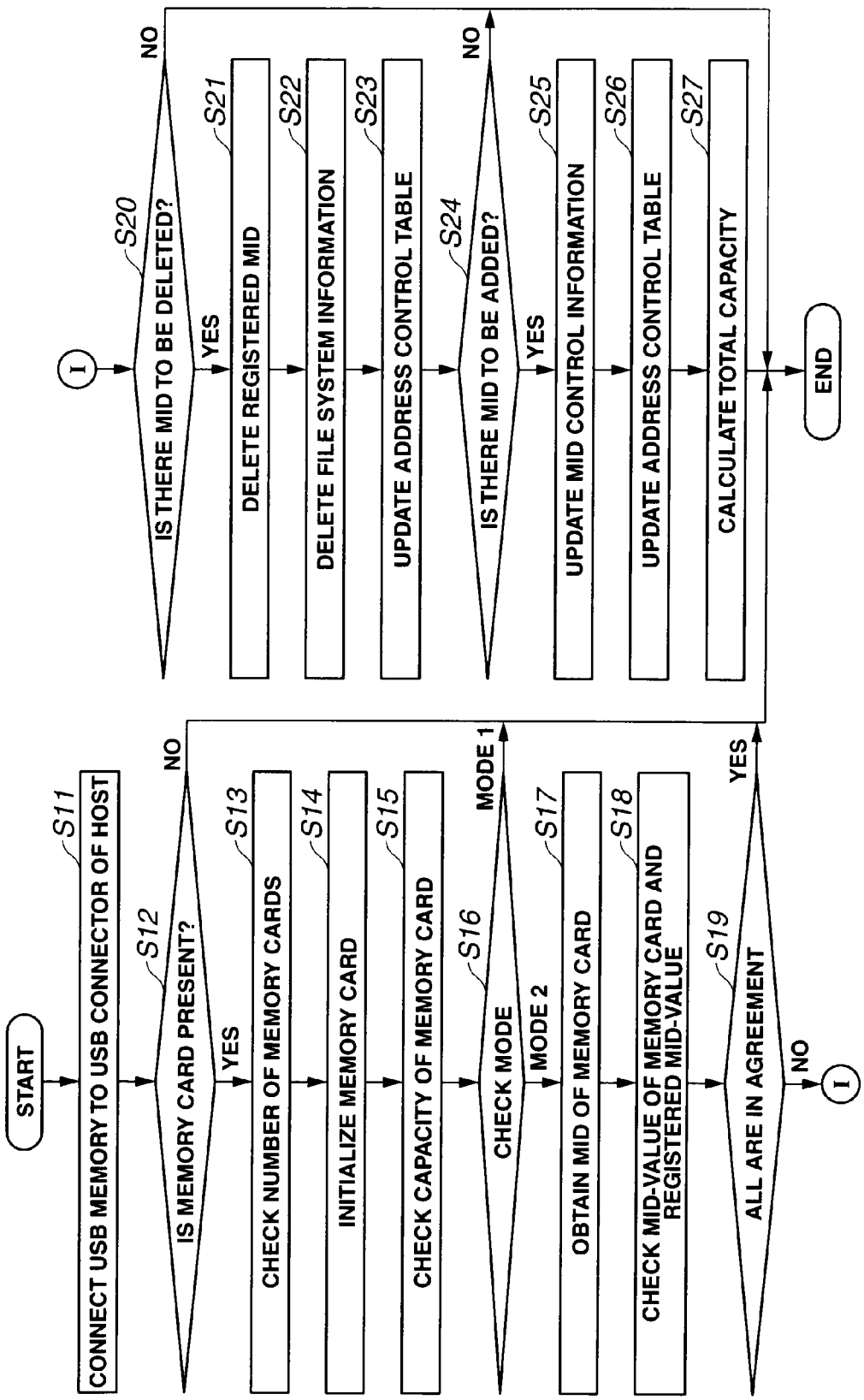
FIG. 4 is a flowchart to explain the flow of the initialization of a USB memory.

Next, by use of FIG. 4 a description will be given of the flow of the initialization of the USB memory 1 that is the semiconductor storage device of the present embodiment. FIG. 4 is a flowchart to explain the flow of the initialization of the USB memory 1.

The description will be given blow with reference to FIG. 4.
<Step S11>
When the USB memory 1 is connected to the host equipment 2 via the USB interface section 14 and the USB connector 2A, power is supplied from the host equipment 2 to the USB memory 1.
<Step S12>
When power is supplied, the controller 19 that is the control section of the USB memory 1 checks whether a small memory card 3 has been inserted into the slot 29. When no small memory card 3 has been inserted into the slot 29 (No), the controller 19 brings the internal NAND memory section 10 alone into an accessible condition, whereby the initialization of the USB memory 1 is completed.

When a small memory card 3 has been inserted into the slot 29 (Yes), the controller 19 starts the processing of step S13. Incidentally, power is supplied to all small memory cards 3 that have been inserted from the host equipment 2 via the USB memory 1.
<Step S13>
First, the controller 19 checks the number of the small memory cards 3 that have been inserted into the slots 29. That is, although the USB memory 1 has a configuration and a function that enable up to four small memory cards 3 to be inserted into the slots 29, it is not necessary that four small memory cards 3 be inserted into the slots 29. The user can use the USB memory 1 by inserting one to four small memory cards 3 into the slot(s) 29 as required. Incidentally, the slot(s) 29 into which one to three small memory cards 3 have been inserted may be any of the four slots.
<Step S14>
Next, the controller 19 performs the processing for the initialization of the small memory card 3 that has been inserted into the slot 29.
<Step S15>
After the processing for the initialization of the small memory card 3, the controller 19 checks the capacity of each of the one or more small memory cards 3 inserted into the slot 29. That is, the controller 19 checks the capacity of each of the second semiconductor memory sections. Of course, it is not always necessary that the capacity of each of the second semiconductor memory sections be the same, but the capacity of each of the second semiconductor memory sections may be larger than the capacity of the NAND memory section 10.
<Step S16>
Next, the controller 19 checks the condition of the switch 12 by use of the mode controlling section 27. That is, the controller 19 checks whether the present memory control mode selected by the user is mode 1 or mode 2. As described above, the USB memory 1 works as a reader/writer of the small memory card 3 when the memory control mode is mode 1, whereas the second semiconductor memory sections of the small memory card 3 work as one memory section integral with the NAND memory section 10 that is the first semiconductor memory section of the USB memory 1 when the memory control mode is mode 2.

When the result of the check by the mode controlling section 27 is mode 1, the processing for initialization performed by the controller 19 is completed with this, because the host equipment 2 makes access to each of the semiconductor memory sections.

When the result of the check by the mode controlling section 27 is mode 2, the controller 19 performs the processing of step S17 and beyond.

<Step S17>

The controller 19 obtains MID-values of all small memory cards 3 inserted in the slots 29 by use of the memory card controlling section 26.

<Step S18>

Next, the memory card controlling section 26 compares the MID-values of small memory cards 3 that were and have already been registered when the small memory cards had been inserted into the slots 29 before, with the MID-values of the small memory cards 3 that have been actually inserted into the slots 29.

<Step S19>

When as a result of the comparison by the memory card controlling section 26 it became evident that the MID-values of all small memory cards 3 inserted into the slots 29 are in agreement with the registered MID-values, this means that the same small memory cards 3 as the small memory cards to which access was made last time are connected to the same slots 29. In this case, it is unnecessary to update the information controlled by the memory card controlling section 26. Therefore, the processing for initialization performed by the controller 19 is completed with this, because the controller 19 can make access to the memory sections by using the logical memory map already retained in the address controlling section 21.

In contrast to this, when as a result of the comparison by the memory card controlling section 26 it became evident that even one of the MID-values of the small memory cards 3 inserted into the slots 29 is not in agreement with the registered MID-values, the controller 19 performs the processing of step S20.

<Step S20>

On the basis of MID information the memory card controlling section 26 checks whether there is a small memory card that was registered at the last access but has not been inserted into the slot 29 this time, i.e., a small memory card 3 discharged from the slot 29. When there is no small memory card 3 discharged from the slot 29 (No), the processing for initialization performed by the controller 19 is completed with this, because the controller 19 can make access to each of the memory sections by using the logical memory map already retained in the address controlling section 21.

When there is a small memory card 3 discharged from the slot 29 (Yes), the controller 19 performs the processing of step S21.

<Step S21>

The memory card controlling section 26 deletes the MID information on the discharged small memory card 3 that was registered at the last access but has not been inserted into the slot 29 this time.

<Step S22>

Next, the memory card controlling section 26 clears a logical address value allocated to the small memory card 3 whose MID information was deleted at step S21 from the logical memory map, and deletes the control information on the discharged small memory card 3 from the file-system control information stored in the file-system control information area 30.

<Step S23>

Next, when logical address values of the logical memory map after the deletion of the MID information at step S22 are not continuous, the memory card controlling section 26 rewrites and updates the file-system control information so that the logical address values become continuous.

<Step S24>

Next, on the basis of the MID information the memory card controlling section 26 checks whether there is a small memory card 3 that has been inserted anew into the slot 29. When there is no new MID information on a new small memory card 3, the processing for initialization performed by the controller 19 is completed with this.

When there is a small memory card 3 that has been added, the memory card controlling section 26 performs the processing of step S25 in order to use the small memory card 3.

Incidentally, when data has been stored in the added small memory card 3, the memory card controlling section 26 inquires of the host equipment 2 whether the data may be erased. A small memory card 3 in which data that should not be erased is stored is controlled in mode 1 of memory control mode. In contrast to this, for a small memory card 3 in which data that may be erased is stored, the memory card controlling section 26 erases the data. Incidentally, for the USB memory 1 into which a plurality of small memory cards 3 have been inserted, it is possible to control each of the small memory cards 3 in a memory control mode suited to the condition of each of the small memory cards 3 and the like.

<Step S25>

The memory card controlling section 26 registers anew the MID information on a small memory card 3 that has been added anew, and updates the MID information.

<Step S26>

Furthermore, the memory card controlling section 26 allocates a logical address value corresponding to the capacity of a small memory card 3 having a new MID-value to the logical memory map and updates the logical memory map.

Incidentally, in the above description, when there are a plurality of MIDs to be deleted and MIDs to be added, the processing for deletion and addition is repeated a plurality of times.

<Step S27>

Lastly, the memory card controlling section 26 calculates a total value of the capacities of all memory sections controlled thereby and the processing for initialization performed by the controller 19 is completed.

Next, with reference to FIG. 5 a description will be given of the flow of processing performed when the host equipment 2 reads out data from the USB memory 1 that is the semiconductor storage device of the present embodiment. FIG. 5 is a flowchart to explain the flow of the processing performed when host equipment 2 reads out data from the USB memory 1.

With reference to FIG. 5 the description is given below of the case where the memory control mode is mode 2.

<Step S31>

A read command from the host equipment 2 is received by the controller 19.

<Step S32>

The controller 19 checks an address value (hereinafter referred to as an "address") specified in the read command. Next, the controller 19 sends the specified address to the address controlling section 21 in order to check which memory the specified address corresponds to. On the basis of a logical address map the address controlling section 21 determines which memory section the specified address corresponds to, and sends the result of the determination to the controller 19. On the basis of the information from the address controlling section 21 the controller 19 performs the following processing suited to the specified address.

<Step S33>

When the specified address ranges from "0x0000_0000" to "0x3FFF_FFFF," the address is the address of the NAND memory section 10 that is the first semiconductor memory section of the USB memory 1 and, therefore, the address controlling section 21 converts the address into the address of the NAND memory section 10.
<Step S34>
The controller 19 reads out data from the NAND memory section 10 that is the first semiconductor memory section.
<Step S35>
When the specified address ranges from "0x4000_0000" to "0x4FFF_FFFF," the address is the address of the second semiconductor memory section 3a of the small memory card 3A and, therefore, the address controlling section 21 converts the address into the address of the small memory card 3A. In the conversion, for example, an offset value from an address boundary is calculated.
<Step S36>
The controller 19 reads out data from the second semiconductor memory section 3a.
<Step S37>
When the specified address ranges from "0x5000_0000" to "0x5FFF_FFFF," the address is the address of the second semiconductor memory section 3b of the small memory card 3B and, therefore, the address controlling section 21 converts the address into the address of the small memory card 3B. In the conversion, for example, an offset value from an address boundary is calculated.
<Step S38>
The controller 19 reads out data from the second semiconductor memory section 3b.
<Step S39>
When the specified address ranges from "0x6000_0000" to "0x6FFF_FFFF," the address is the address of the second semiconductor memory section 3c of the small memory card 3C and, therefore, the address controlling section 21 converts the address into the address of the small memory card 3C. For example, an offset value from an address boundary is calculated.
<Step S40>
The controller 19 reads out data from the second semiconductor memory section 3c.
<Step S41>
When the specified address ranges from "0x7000_0000" to "0x7FFF_FFFF," the address is the address of the second semiconductor memory section 3d of the small memory card 3D and, therefore, the address controlling section 21 converts the address into the address of the small memory card 3D. For example, an offset value from an address boundary is calculated.
<Step S42>
The controller 19 reads out data from the second semiconductor memory section 3d.
<Step S43>
The controller 19 sends the read-out data to the host equipment 2.

Incidentally, when the memory control mode is mode 1, as with a usual reader/writer device the host equipment 2 sends a command to each memory section to which the host equipment 2 makes access, and reads out data separately from the NAND memory section 10 or from the second semiconductor memory sections 3a to 3d of each small memory card 3.

The host equipment 2 may perform processing for parallel writing for a plurality of memory sections. The logical memory map in this case may be different form the logical memory map shown in FIG. 3.

As in the above description, because the USB memory 1 that is the semiconductor storage device of the present embodiment can not only make access to the small memory cards 3 individually, but also use the small memory cards 3 inserted into the USB memory 1 as an expansion memory of the built-in memory of the USB memory 1, it is possible to increase the storage capacity of the USB memory 1.

That is, the USB memory 1 itself is the first semiconductor storage device having the NAND memory section 10 that is the first semiconductor memory section and can be used as an auxiliary storage device of the host equipment 2 when used singly. At the same time, when the capacity of the NAND memory section 10 becomes insufficient, the USB memory 1 can be used as a semiconductor storage device having a larger capacity by inserting the small memory card 3 into the slot 29 of the USB memory 1.

That is, the USB memory 1 has the NAND memory section 10, a first interface section for the input and output of data with the host equipment 2, and a control section that performs read/write control and the like, and is a device capable of working as an auxiliary storage device by being connected to the host equipment 2. If the host equipment 2 has a second interface section, also the small memory card 3 is a semiconductor storage device capable of working as an auxiliary storage device of the host equipment 2 by being connected directly to the host equipment 2. For this reason, unlike a so-called expansion memory substrate or the like composed of a memory section alone, the user can easily insert the small memory card 3 into the USB memory 1. Furthermore, when the user wants to temporarily increase the capacity of the USB memory 1, the user can temporarily use the small memory card 3 in the USB memory 1 by taking out the small memory card 3 used in a cell phone, for example.

Also, because the USB memory 1 is such that a plurality of small memory cards 3 can be inserted into the slots 29, even in the case of an old-type small memory card 3, it is possible to add a large storage capacity to the USB memory 1. For this reason, an old-type small memory card 3 can be used until the expected product life thereof is reached. Conversely, a small memory card 3 or the like having a larger capacity than an old-type small-capacity USB memory is inserted into the slot 29 of the USB memory, whereby the old-type USB memory can be used until the expected product life thereof is reached.

Because even when the small memory card 3 is housed, the size of the USB memory 1 is the same as before the small memory card 3 is housed, the portability and handleability do not worsen.

Incidentally, as in the above description, a USB memory is preferable as the first semiconductor storage device of the present invention, and a micro SD card is preferable as the second semiconductor storage device. However, semiconductor storage devices having an interface section meeting other standards may also be used. For example, it is preferred that the first interface section and the second interface section be each an interface section meeting any of the USB standard, the SD standard and an eSATA standard.

The eSATA standard is a kind of serial ATA (SATA) that is an interface standard for personal computers and a standard for connecting mainly hard disk drives and the like. However, the eSATA standard can be used also in semiconductor storage devices. The transfer speed is 60 MB/s maximum in the USB standard, whereas in the eSATA standard transfer can be performed at a speed of 150 MB/s maximum.

Incidentally, the first interface section and the second interface section may be interface sections of the same standard in a broad sense. For example, an SD memory card connected to the host equipment via the first interface section meeting the SD standard can be used as the first semiconductor storage device of the present invention, and a micro SD card having the second interface section meeting the micro SD standard can be used as the second semiconductor storage device.

As the memory card, not only an SD memory card, but also a CompactFlash (a registered trade mark) memory card, a smart media card, a multi-media card, a memory stick card and the like may also be used.

As in the above description, the control section can control by one linear address the semiconductor storage device of the present invention, even when the first interface section of the first semiconductor storage device and the second interface section of the second semiconductor storage device are interface sections meeting different standards.

Although the above description was given of an example of the USB memory 1 in which four micro SD cards can be housed, it is necessary only that the first semiconductor storage device be able to house one ore more second semiconductor storage devices, preferably not more than eight second semiconductor storage devices. If the number of the second semiconductor storage devices is less than the above-described range, it is impossible to ensure that the effects of the present invention are produced. If the above-described range is exceeded, the first semiconductor storage device becomes large and the portability may be come worse.

Although the small memory card 3 was described about the USB memory that can completely house the small memory card 3 in the housing thereof, it is not always necessary that the USB memory be able to completely house the small memory card 3 in the housing thereof. That is, part of the second semiconductor storage device may protrude from the housing of the first semiconductor storage device so long as the first semiconductor storage device and the second semiconductor storage device are connectable via the first interface section and the second interface section.

Having described the preferred embodiments of the invention referring to the accompanying drawings, it should be understood that the present invention is not limited to those precise embodiments and that various changes and modifications thereof could be made by one skilled in the art without departing from the spirit or scope of the invention as defined in the appended claims.

What is claimed is:

1. A semiconductor storage device comprising:
   a first interface section for connection to host equipment;
   a first semiconductor memory section;
   a second interface section to which one or more second semiconductor storage devices are connectable, each having a second semiconductor memory section;
   a control section configured to control the first semiconductor memory section and the one or more second semiconductor memory sections by one linear address range; and
   a mode selecting section that selects either a control mode configured to control the first semiconductor memory section and the one or more second semiconductor memory sections by the one linear address range or a control mode configured to control the first semiconductor memory section and the one or more second semiconductor memory sections by independent linear address ranges, wherein the control section controls the first semiconductor memory section and the second semiconductor memory sections on the basis of the selection by the mode selecting section.

2. The semiconductor storage device according to claim 1, wherein the one or more second semiconductor storage devices are capable of being housed in an housing of the semiconductor storage device.

3. The semiconductor storage device according to claim 1, wherein the first interface section and the second interface section are each an interface section that meets any of the USB standard, the SD standard and the SATA standard.

4. The semiconductor storage device according to claim 1, wherein the first semiconductor memory section and the second semiconductor memory sections have a NAND type flash memory, the first interface section being an interface section meeting a USB standard, and the second interface section being an interface section meeting a SD standard.

5. The semiconductor storage device according to claim 1, wherein when the selecting section selects the control mode configured to control the first semiconductor memory section and the one or more second semiconductor memory sections by the one linear address range, the first semiconductor memory section and the one or more second semiconductor memory sections act as a single memory having a single continuous address range and having a memory capacity equal to the combined memory capacity of the first semiconductor memory section and the one or more second semiconductor memory sections.

6. The semiconductor storage device according to claim 1, wherein the one linear address range corresponds to an address range that is larger than an address range of each of the independent linear address ranges.

7. A semiconductor storage device comprising:
   a first interface section meeting a first standard, for connection to host equipment;
   a first semiconductor memory section having a NAND type flash memory;
   a second interface section meeting a second standard, to which one or more second semiconductor storage devices are connectable, including second semiconductor memory sections each having a NAND type flash memory;
   a housing capable of housing the one or more second semiconductor storage devices therein;
   a control section configured to control the first semiconductor memory section and the one or more second semiconductor memory sections having interface sections meeting different standards by one linear address range; and
   a mode selecting section that selects either a control mode configured to control the first semiconductor memory section and the one or more second semiconductor memory sections by the one linear address range or a control mode configured to control the first semiconductor memory section and the one or more second semiconductor memory sections by independent linear address ranges, wherein the control section controls the first semiconductor memory section and the second semiconductor memory sections on the basis of the selection by the mode selecting section.

8. The semiconductor storage device according to claim 7, wherein the first semiconductor memory section and the second semiconductor memory sections have a NAND type flash memory, the first interface section being an interface section meeting the USB standard, and the second interface section being an interface section meeting the SD standard.

9. A device comprising:
   a USB interface section serving as a first interface section for connection to host equipment;
   a second interface section to which a plurality of semiconductor storage devices each having a semiconductor memory section are connectable, the second interface section meeting a standard different from that of the first interface section;
   a housing capable of housing the plurality of semiconductor storage devices;

a control section configured to control the plurality of semiconductor memory sections by one linear address range; and a mode selecting section that selects either a control mode configured to control the plurality of semiconductor memory sections by the one linear address range or a control mode configured to control the plurality of semiconductor memory sections by independent linear address ranges, wherein the control section controls the semiconductor memory sections on the basis of the selection by the mode selecting section.

10. The device according to claim 9, wherein the plurality of semiconductor storage devices are insertable into the housing from a side surface of the housing.

11. The device according to claim 9, wherein the plurality of semiconductor storage devices are capable of being completely housed in the housing.

12. The device according to claim 9, wherein the second interface section is an interface section meeting the SD standard.

13. The device according to claim 12, wherein the plurality of semiconductor storage devices are memory cards meeting one of micro SD standard and the micro SDHC standard.

14. A method, implemented on a semiconductor storage device that includes a first interface section for connection to host equipment, a first semiconductor memory section, a second interface section to which one or more second semiconductor storage devices are connectable, each having a second semiconductor memory section, a control section, and a mode selecting section, the method comprising:

controlling, at the control section, the first semiconductor memory section and the one or more second semiconductor memory sections by one linear address range; and selecting, at the mode selecting section either a control mode configured to control the first semiconductor memory section and the one or more second semiconductor memory sections by the one linear address range or a control mode configured to control the first semiconductor memory section and the one or more second semiconductor memory sections by independent linear address ranges, wherein the control section controls the first semiconductor memory section and the second semiconductor memory sections on the basis of the selection by the mode selecting section.

* * * * *